(12) United States Patent
Li et al.

(10) Patent No.: US 10,968,047 B2
(45) Date of Patent: Apr. 6, 2021

(54) SELF-ADAPTIVE LUGGAGE TRANSFER DEVICE AND SYSTEM

(71) Applicant: Sichuan University, Sichuan (CN)

(72) Inventors: Wenqiang Li, Sichuan (CN); Song Li, Sichuan (CN); Chen Chen, Sichuan (CN); Zhong Tang, Sichuan (CN); Wu Zhao, Sichuan (CN); Chuanxiao Li, Sichuan (CN)

(73) Assignee: Sichuan University, Sichuan (CN)

( * ) Notice: Subject to any disclaimer, the term of this patent is extended or adjusted under 35 U.S.C. 154(b) by 0 days.

(21) Appl. No.: 17/010,274

(22) Filed: Sep. 2, 2020

(65) Prior Publication Data

US 2021/0061581 A1 Mar. 4, 2021

(30) Foreign Application Priority Data

Sep. 3, 2019 (CN) .......................... 201910830749.1

(51) Int. Cl.
*B65G 47/57* (2006.01)
*B65G 41/00* (2006.01)
(Continued)

(52) U.S. Cl.
CPC ............ *B65G 47/57* (2013.01); *B65G 13/12* (2013.01); *B65G 21/14* (2013.01); *B65G 41/003* (2013.01);
(Continued)

(58) Field of Classification Search
CPC ............ B65G 2201/0264; B65G 15/26; B65G 47/643; B65G 47/57; B65G 13/12;
(Continued)

(56) References Cited

U.S. PATENT DOCUMENTS

| 4,499,988 A * | 2/1985 | Gasser | ................ B65G 47/647 198/369.2 |
| 5,207,350 A * | 5/1993 | Spanton | ............... H05K 13/021 198/435 |

(Continued)

FOREIGN PATENT DOCUMENTS

| CN | 203544989 U | 4/2014 |
| CN | 104401904 A | 3/2015 |

(Continued)

*Primary Examiner* — James R Bidwell

(57) ABSTRACT

A self-adaptive luggage transfer device and system. The self-adaptive luggage transfer device includes a base, a conveyor mechanism, a lifting mechanism and a self-adaptive extendable transfer mechanism. The lifting mechanism is arranged between the conveyor mechanism and the base and is configured to drive the conveyor mechanism to lift. The self-adaptive extendable transfer mechanism is obliquely arranged between the conveyor mechanism and the base and is in transmission connection with the lifting mechanism. Two ends of the self-adaptive extendable transfer mechanism are movably connected to an output end of the conveyor mechanism and the base, respectively. The conveyor mechanism is configured to drive an end of the self-adaptive extendable transfer mechanism connected to the conveyor mechanism to lift in a first direction, and the lifting mechanism is configured to drive at least one end of the self-adaptive extendable transfer mechanism to move in a second direction.

16 Claims, 4 Drawing Sheets

(51) Int. Cl.
*B66F 7/06* (2006.01)
*B65G 21/14* (2006.01)
*B65G 13/12* (2006.01)
*B65G 15/00* (2006.01)

(52) U.S. Cl.
CPC .......... *B65G 41/008* (2013.01); *B66F 7/0666* (2013.01); *B65G 15/00* (2013.01); *B65G 2201/0264* (2013.01)

(58) Field of Classification Search
CPC .... B65G 21/14; B65G 41/003; B65G 41/008; B66F 7/0666
USPC .............................. 198/861.1, 435, 594, 812
See application file for complete search history.

(56) References Cited

U.S. PATENT DOCUMENTS

| | | | | |
|---|---|---|---|---|
| 5,909,796 A * | 6/1999 | Soldavini | ............ | B65G 47/647 198/369.2 |
| 6,227,377 B1 * | 5/2001 | Bonnet | .................. | B65G 21/12 198/435 |
| 8,622,199 B2 * | 1/2014 | Windfeld | ............. | B65G 41/005 198/588 |
| 2002/0015635 A1 * | 2/2002 | Sinn | ..................... | B65G 41/008 414/346 |
| 2008/0118337 A1 * | 5/2008 | Vestergaard | ......... | B65G 41/008 414/340 |
| 2008/0315168 A1 * | 12/2008 | Takeuchi | ............... | B66F 7/0666 254/358 |
| 2012/0067694 A1 * | 3/2012 | Philipp | .................. | B65G 47/57 198/369.2 |
| 2016/0068344 A1 * | 3/2016 | Mast | ..................... | B65G 13/12 198/463.1 |

FOREIGN PATENT DOCUMENTS

| | | |
|---|---|---|
| CN | 105035720 A | 11/2015 |
| CN | 106628811 A | 5/2017 |
| CN | 206654440 U | 11/2017 |
| KR | 20160044749 A | 4/2016 |

* cited by examiner

US 10,968,047 B2

SELF-ADAPTIVE LUGGAGE TRANSFER DEVICE AND SYSTEM

CROSS-REFERENCE TO RELATED APPLICATIONS

This application claims the benefit of priority from Chinese Patent Application No. 201910830749.1, filed on Sep. 3, 2019. The content of the aforementioned application, including any intervening amendments thereto, is incorporated herein by reference in its entirety.

TECHNICAL FIELD

This application relates to automatic luggage transfer, and more particularly to a self-adaptive luggage transfer device and system.

BACKGROUND OF THE DISCLOSURE

Generally, passengers' luggage needs to be manually transferred in travel centers such as airports or ports. For example, after the arrival of flights, passengers' luggage is stacked on luggage cars, and at this time, ground service staff has to carry the stacked luggage one by one from the top to the ground conveyor belt. This causes a strong working intensity and a high labor cost in the transfer process. Besides, the transfer process has a low efficiency, and thus a long time is needed for the passengers to wait the luggage.

SUMMARY OF THE DISCLOSURE

The present disclosure aims to provide a self-adaptive luggage transfer device, which can reduce labor cost and labor intensity of workers during the luggage transfer, and can improve luggage transfer efficiencies.

The present disclosure further aims to provide a self-adaptive luggage transfer system, which can reduce labor cost and labor intensity of workers during the luggage transfer, and can improve luggage transfer efficiencies.

The present disclosure provides a self-adaptive luggage transfer device, comprising a base, a conveyor mechanism, a lifting mechanism and a self-adaptive extendable transfer mechanism;

wherein the lifting mechanism is arranged between the conveyor mechanism and the base, and is configured to drive the conveyor mechanism to lift relative to the base;

the self-adaptive extendable transfer mechanism is obliquely arranged between the conveyor mechanism and the base, and two ends of the self-adaptive extendable transfer mechanism are movably connected to an output end of the conveyor mechanism and the base, respectively; the conveyor mechanism is configured to drive an end of the self-adaptive extendable transfer mechanism connected to the conveyor mechanism to lift in a first direction, and the lifting mechanism is configured to drive at least one end of the self-adaptive extendable transfer mechanism to move in a second direction, so as to ensure that an inclination angle of the self-adaptive extendable transfer mechanism relative to the conveyor mechanism is constant within a preset range.

In some embodiments, the self-adaptive luggage transfer device further comprises a linkage mechanism comprising a first connecting rod, a movable part, and a second connecting rod; one end of the first connecting rod and one end of the second connecting rod are movably connected to the movable part, respectively; the other end of the first connecting rod is connected to the lifting mechanism, and the other end of the second connecting rod is connected to an end of the self-adaptive extendable transfer mechanism connected to the base; and the lifting mechanism drives the first connecting rod and the second connecting rod to move toward or away from each other in the second direction.

In some embodiments, the lifting mechanism comprises a first cross frame and a drive member arranged on the base; two ends of the first cross frame are respectively connected to the conveyor mechanism and the base; a movable side of the end of the first cross frame connected to the base is connected to the drive member and the end of the first connecting rod away from the movable part, respectively, and the drive member drives the movable side of the end of the first cross frame to slide relative to the base in the second direction.

In some embodiments, the movable part is provided with a first groove and a second groove; a first slider is rotatably provided at one end of the first connecting rod and is slidably arranged in the first groove; and a second slider is provided at one end of the second connecting rod and is slidably arranged in the second groove.

In some embodiments, the first groove and the second groove extend in a same straight line; and a position between the first groove and the second groove on the movable part is rotatably connected to the base.

In some embodiments, the linkage mechanism further comprises a sliding frame; the base is provided with a slide rail extending in the second direction; one end of the sliding frame is connected to the end of the second connecting rod away from the movable part, and the other end of the sliding frame passes through the slide rail and is rotatably connected to the end of the self-adaptive extendable transfer mechanism away from the conveyor mechanism.

In some embodiments, the sliding frame comprises a transverse frame, a first sliding structure, and a second sliding structure; the transverse frame is connected to the end of the second connecting rod away from the movable part; one end of the first sliding structure and one end of the second sliding structure are respectively connected to two ends of the transverse frame; there are two slide rails; and the other end of the first sliding structure and the other end of the second sliding structure respectively pass through the two slide rails and are rotatably connected to the self-adaptive extendable transfer mechanism.

In some embodiments, the self-adaptive extendable transfer mechanism comprises a second cross frame and a plurality of seated rollers which are sequentially arranged on the second cross frame along an extending direction of the second cross frame; a seated roller at one end of the second cross frame is rotatably connected to the output end of the conveyor mechanism, and a seated roller at the other end of the second cross frame is rotatably connected to the sliding frame.

In some embodiments, each of the seated rollers comprises a mounting seat and a roller which is rotatably arranged on the mounting seat; and the mounting seat is connected to the second cross frame which is movable.

The present disclosure further provides a self-adaptive luggage transfer system, comprising a ground conveyor and the self-adaptive luggage transfer device. The self-adaptive luggage transfer device comprises the base, the conveyor mechanism, the lifting mechanism and the self-adaptive extendable transfer mechanism. The lifting mechanism is arranged between the conveyor mechanism and the base, and is configured to drive the conveyor mechanism to rise and fall. The self-adaptive extendable transfer mechanism is obliquely arranged between the conveyor mechanism and the lifting mechanism, and two ends of the self-adaptive extendable transfer mechanism are movably connected with an output end of the conveyor mechanism and the base, respectively. The conveyor mechanism drives the end of the self-adaptive extendable transfer mechanism connected to the conveyor mechanism to lift in the first direction, and the lifting mechanism drives at least one end of the self-adaptive extendable transfer mechanism to lift in the second direction, so as to ensure that an inclination angle of the self-adaptive extendable transfer mechanism relative to the conveyor mechanism is constant within a preset range. The ground conveyor is arranged under the end of the self-adaptive extendable transfer mechanism connected to the base.

In practical applications of the self-adaptive luggage transfer device, the lifting mechanism drives the conveyor mechanism to lift according to the height of the stacked luggage. Therefore, workers only need to carry the stacked luggage to the conveyor mechanism having the same height with the stacked luggage, in which no height difference exists, rendering the moving process convenient. The conveyor mechanism drives the end of the self-adaptive extendable transfer mechanism connected to the conveyor mechanism to move in the vertical direction. Meanwhile, at least one end of the self-adaptive extendable transfer mechanism is driven by the lifting mechanism to move in the horizontal direction. The self-adaptive extendable transfer mechanism moves in the horizontal and vertical directions in order to extend in an extension direction thereof. In this way, the inclination angle of the self-adaptive extendable transfer mechanism relative to the conveyor mechanism is ensured to be constant during the lifting of the conveyor mechanism, which allows the luggage output by the conveyor mechanism to be stably transferred on the ground conveyor belt. Therefore, the self-adaptive luggage transfer device is able to assist the luggage transfer, which reduces the labor intensity and improves the transfer speed while ensuring the safety of the baggage.

BRIEF DESCRIPTION OF THE DRAWINGS

Accompanying drawings for embodiments of the present disclosure will be briefly described as follows, from which technical solutions of the present disclosure will be clearer. It should be understood that the accompanying drawings only show some embodiments of the present present disclosure and therefore should not be considered as limiting the scope of the present disclosure. Other drawings can be obtained based on embodiments of the present disclosure by those of ordinary skill in the art without any creative effort.

Figure 1:
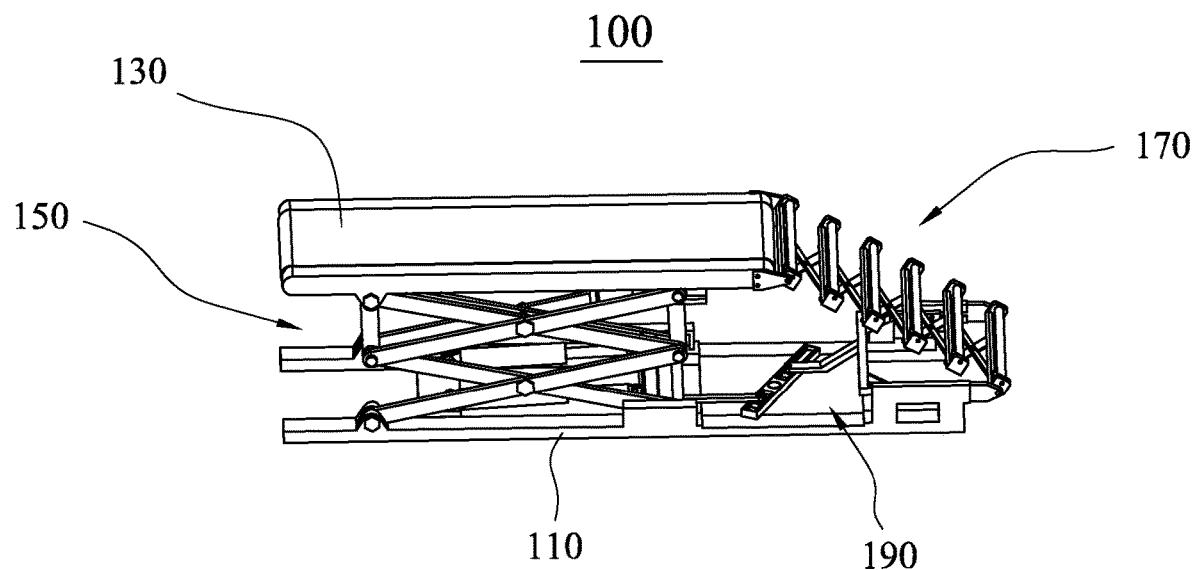
FIG. 1 is a schematic diagram of a self-adaptive luggage transfer device according to an embodiment of the present disclosure.

In the drawings: 100, self-adaptive luggage transfer device; 110, base; 111, slide rail; 130, conveyor mechanism; 150, lifting mechanism; 151, first cross frame; 153, drive member; 170, self-adaptive extendable transfer mechanism; 171, second cross frame; 173, seated roller; 1731, mounting seat; 1733, roller; 190, linkage mechanism; 191, first connecting rod; 1911, first slider; 193, movable part; 1931, first groove; 1933, second groove; 195, second connecting rod; 1951, second slider; 197, sliding frame; 1971, transverse frame; 1973, first sliding structure; 1975, second sliding structure; 200, self-adaptive luggage transfer system; 210, ground conveyor.

DETAILED DESCRIPTION OF EMBODIMENTS

The present disclosure will be described in detail below with reference to the accompanying drawings and embodiments, which makes objects, technical solutions and advantages of the present disclosure clear and complete. Obviously, the described embodiments are a part of embodiments of the present disclosure. Components in the accompanying drawings may be arranged in various different configurations.

Therefore, this embodiment is illustrative of the present disclosure, and is not intended to limit the scope of the present disclosure. All other embodiments obtained by those of ordinary skill in the art based on the embodiments of the present disclosure without any creative effort shall fall within the scope of the present disclosure.

It should be noted that similar reference numerals and letters indicate similar items in the accompanying drawings. Therefore, once an item is defined in one figure, there is no need to further define and explain the item in other figures.

It should be understood that, in the description of the present disclosure, terms such as "upper", "lower", "inner", "outer", "left" and "right" indicate the orientation or positional relationship based on the orientation or positional relationship shown in the drawings, which is only for ease of description, but not intended to indicate or imply that devices or elements must have a specific orientation or be constructed and operated in a specific orientation. Therefore, this is not intended to limit the scope of the present disclosure, and for those skilled in the art, the specific meanings of above-mentioned terms should be understood based on the specific conditions.

The terms "first" and "second" are for ease of description, and cannot be understood as indicating or implying relative importance of technical features.

It should be noted that unless specified, terms "provide", "communicate" and "connect" should be understood broadly. For example, "fix" may result in a fixed connection, a detachable connection, or an integrated configuration of elements. The elements may be connected mechanically or electrically; or directly connected or indirectly connected through an intermediate medium. Alternatively, two elements may be in communication or interact with each other unless specified. For the skilled in the art, the specific meanings of the above terms in the present disclosure can be understood according to specific conditions.

The embodiment of the present disclosure is described in detail with reference to the accompanying drawings.

Embodiment 1

Referring to FIG. 1, this embodiment provides a self-adaptive baggage transfer device 100, which is applicable to airports, ports, stations, etc., to assist workers in transferring luggage. It can reduce labor intensity, increase transfer speed while ensuring the luggage safety. In this embodiment, the self-adaptive baggage transfer device 100 is applied to an airport luggage car.

Illustrated is a self-adaptive baggage transfer device 100, including a base 110, a conveyor mechanism 130, a lifting mechanism 150, a self-adaptive extendable transfer mechanism 170 and a linkage mechanism 190.

The lifting mechanism 150 is arranged on the base 110 which is placed on ground, and the conveyor mechanism 130 is arranged at an end of the lifting mechanism 150 away from the base 110, that is, the conveyor mechanism 130 is arranged at a top of the lifting mechanism 150. The lifting mechanism is configured to drive the conveyor mechanism 130 to rise and fall in a vertical direction, which is suitable for the airport luggage car. This enables the conveyor mechanism to reach luggage which is located at positions of different heights and stacked on the luggage car, so that the luggage can be conveniently carried to the conveyor mechanism 130 by ground service staff in the airport. The conveyor mechanism is configured to convey the luggage. In this embodiment, the conveyor mechanism is a conveyor belt.

The self-adaptive extendable transfer mechanism 170 is obliquely arranged between the conveyor mechanism 130 and the base 110, and two ends of the self-adaptive extendable transfer mechanism 170 are movably connected with an output end of the conveyor mechanism 130 and the base 110, respectively. The self-adaptive extendable transfer mechanism 170 is configured to receive the luggage output from the output end of the conveyor mechanism 130 and transport the luggage to a ground conveyor belt.

When the lifting mechanism 150 drives the conveyor mechanism 130 to lift in the vertical direction, the end of the self-adaptive extendable transfer mechanism 170 connected to the conveyor mechanism 130 is lifted in the vertical direction. In order to ensure that the self-adaptive extendable transfer mechanism 170 can stably transport the luggage, a proper included angle between the conveyor mechanism 130 and the self-adaptive extendable transfer mechanism is kept constant during the lifting process. Therefore, at least one end of the self-adaptive extendable transfer mechanism 170 is in transmission connection with the lifting mechanism 150 through the linkage mechanism 190. When the lifting mechanism 150 drives the conveyor mechanism 130 to lift, the linkage mechanism 190 drives at least one end of the self-adaptive extendable transfer mechanism 170 to move in a second direction, i.e., the horizontal direction, so as to ensure that an inclination angle of the self-adaptive extendable transfer mechanism 170 relative to the conveyor mechanism 130 is constant within a preset range. In practical applications, the conveying range is used as the preset range. In this way, the self-adaptive extendable transfer mechanism 170 can smoothly convey the luggage on the conveyor mechanism 130 to the ground conveyor belt to avoid being pumped, thereby ensuring the safety of the luggage.

The preset range is the movement range of at least one end of the self-adaptive extendable transfer mechanism 170 in the horizontal direction driven by the lifting mechanism 150 through the linkage mechanism 190. When the movement exceeds the preset range, the self-adaptive extendable transfer mechanism 170 rotates relative to the conveyor mechanism 130. As this time, the inclination angle of the self-adaptive extendable transfer mechanism relative to the conveyor mechanism 130 starts to change.

Figure 2:
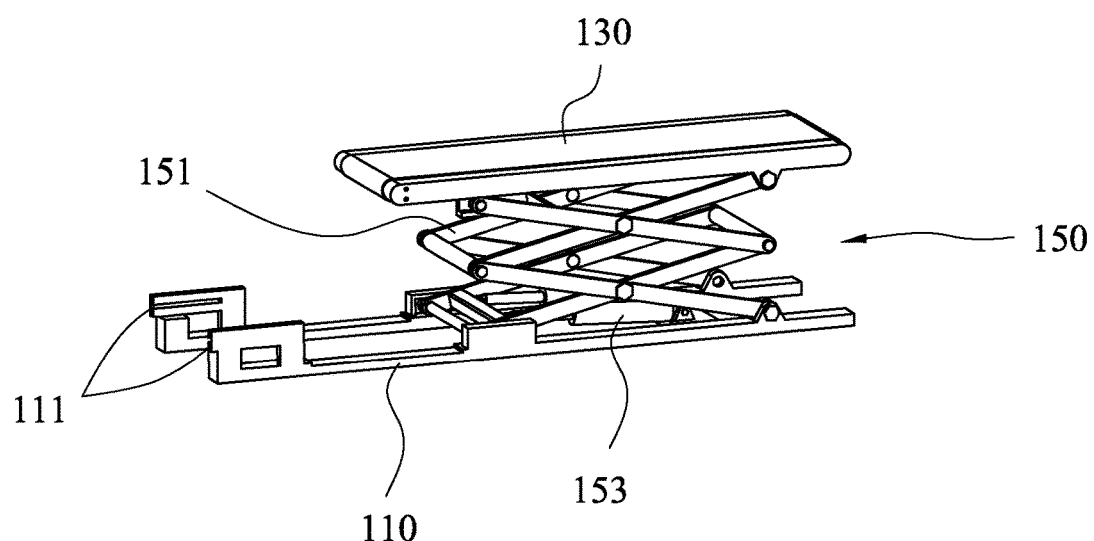
FIG. 2 schematically shows the connection structure of a lifting mechanism, a conveyor mechanism and a base in FIG. 1.

Referring to FIGS. 1 and 2, the lifting mechanism 150 includes a first cross frame 151 and a drive member 153. Two ends of the first cross frame 151 are respectively connected to the conveyor mechanism 130 and the base 110. A fixed side of the end of the first cross frame 151 connected to the base 110 is hinged with the base 110, and a movable side of the end of the first cross frame 151 connected to the base 110 is slidably fitted with the base 110. Similarly, a fixed side of an end of the first cross frame 151 connected to the conveyor mechanism 130 is hinged with the conveyor mechanism 130, and a movable side of the end of the first cross frame 151 connected to the conveyor mechanism 130 is slidably fitted with the conveyor mechanism 130.

The drive member 153 is arranged on the base 110, and an output end of the drive member 153 is connected to the movable side of the end of the first cross frame 151 connected to the base 110 for driving the movable side of the end of the first cross frame 151 connected to the base 110 to slide in the horizontal direction relative to the base, so that the first cross frame 151 extends and retracts to drive the conveyor mechanism 130 to rise and fall. In practical applications, the drive member 153 may be a hydraulic cylinder or an air cylinder. In some embodiments, the drive member 153 may be arranged on the conveyor mechanism 130, and an output end of the drive member 153 may be connected to the movable side of the end of the first cross frame 151 connected to the conveyor mechanism 130.

In this embodiment, the movable side of the end of the first cross frame 151 connected to the base 110 is in transmission connection with the end of the self-adaptive extendable transfer mechanism 170 connected to the base 110 through the linkage mechanism 190. The movable side of the end of the first cross frame 151 connected to the base 110 slides relative to the base 110 in the second direction, that is, during the lifting process of the conveyor mechanism 130, the linkage mechanism 190 drives the end of the self-adaptive extendable transfer mechanism connected to the base 110 moves in the second direction, so that the inclination angle of the self-adaptive extendable transfer mechanism 170 relative to the conveyor mechanism 130 is kept constant.

Figure 3:
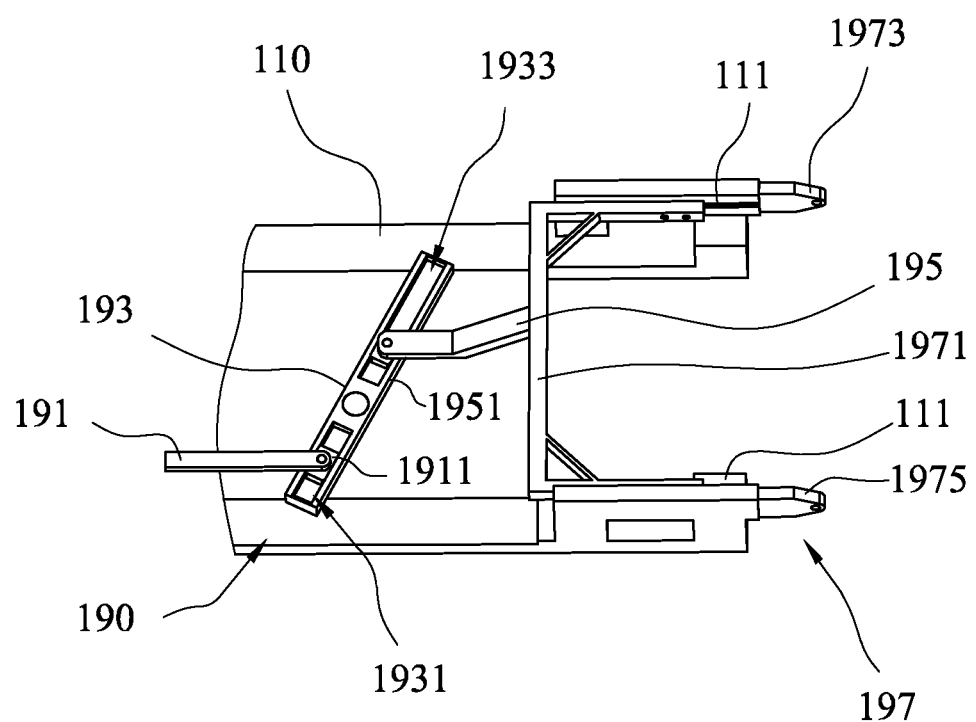
FIG. 3 schematically shows the connection structure of a linkage mechanism and the base in FIG. 1.

Referring to FIGS. 1 and 3, the linkage mechanism 190 includes a first connecting rod 191, a movable part 193, and a second connecting rod 195. One end of the first connecting rod 191 and one end of the second connecting rod 195 are movably connected to the movable part 193, respectively. The other end of the first connecting rod 191 is connected to the movable side of the end of the first cross frame 151 connected to the base 110, and the other end of the second connecting rod 195 is connected to the end of the self-adaptive extendable transfer mechanism 170 connected to the base 110. The lifting mechanism 150 drive the first connecting rod 191 and the second connecting rod 195 to move toward or away from each other in the second direction.

In this embodiment, when the movable end of the first cross frame 151 drives the first connecting rod 191 to move towards the self-adaptive extendable transfer mechanism 170 in the second direction, the conveyor mechanism 130 is driven to fall. At this time, the first connecting rod 191 drives the second connecting rod 195 to move toward the first connecting rod 191 in the second direction through the movable part 193, that is, the first connecting rod 191 drives the end of the self-adaptive extendable transfer mechanism 170 connected to the base 110 to move towards the movable end of the first cross frame in the second direction. This allows the self-adaptive extendable transfer mechanism 170 to extend during the rising of the conveyor mechanism 130, and meanwhile, the inclination angle of the self-adaptive extendable transfer mechanism relative to the conveyor mechanism 130 is kept constant.

In this embodiment, the movable part 193 is provided with a first groove 1931 and a second groove 1933 which extend in a same straight line. A position between the first groove 1931 and the second groove 1933 on the movable part 193 is rotatably connected to the base 110. One end of the first connecting rod 191 is rotatably provided with a first slider 1911 which is slidably arranged in the first groove 1931, and one end of the second connecting rod 195 is rotatably arranged with a second slider 1951 which is slidably arranged in the second groove 1933.

Therefore, when the first connecting rod 191 is driven by the movable side of the end of the first cross frame 151 connected to the base 110 to move toward or away from the second connecting rod 195, the first slider 1911 abuts a wall of the first groove 1931 and is driven to move in the first groove 1931, so that the movable part 193 is pushed to rotate. Since the movable part 193 is rotated, and a wall of the second groove 1933 abuts the second slider 1951, the second connecting rod 195 is driven to move away from or towards the second connecting rod 195. The first groove 1931 and the second groove 1933 are arranged on opposite sides of the movable part 193 through which the movable part 193 is rotatably connected to the base 110. When the movable part 193 rotates, the first connecting rod 191 and the second connecting rod 195 move oppositely in the second direction.

In some embodiments, the linkage mechanism 190 may be of other structures, and the mounting position and objects connected by the linkage mechanism 190 can also be adaptively adjusted, which are not limited herein. For example, when one end of the self-adaptive extendable transfer mechanism 170 connected to the conveyor mechanism 130 is in transmission connection with the movable side of the end of the first cross frame 151 connected to the conveyor mechanism 130 through the linkage mechanism 190, the structure of the linkage mechanism 190 should be adaptively adjusted, so as to allow the one end of the self-adaptive extendable transfer mechanism 170 connected to the conveyor mechanism 130 and the movable side of the end of the first cross frame 151 connected to the conveyor mechanism 130 to move towards the same direction in the second direction.

Referring to FIG. 3, the linkage mechanism 190 further includes a sliding frame 197. The base 110 is provided with a slide rail 111 extending in the second direction. One end of the sliding frame 197 is connected to the end of the second connecting rod 195 away from the movable part 193, and the other end of the sliding frame 197 passes through the slide rail 111 and is rotatably connected to the end of the self-adaptive extendable transfer mechanism 170 away from the conveyor mechanism 130, that is, the self-adaptive extendable transfer mechanism 170 is slidably connected to the base 110 through the sliding frame 197.

The sliding frame 197 includes a transverse frame 1971, a first sliding structure 1973, and a second sliding structure 1975. The transverse frame 1971 is connected to the end of the second connecting rod 195 away from the movable part 193. One end of the first sliding structure 1973 and one end of the second sliding structure 1975 are respectively connected to two ends of the transverse frame 1971. There are two slide rails 111. The other end of the first sliding structure 1973 and the other end of the second sliding structure 1975 respectively pass through the two slide rails 111 and are rotatably connected to the self-adaptive extendable transfer mechanism 170. The first sliding structure 1973 and the second sliding structure 1975 are connected to the self-adaptive extendable transfer mechanism 170, so as to ensure that the luggage is stably transferred on the self-adaptive extendable transfer mechanism 170.

Figure 4:
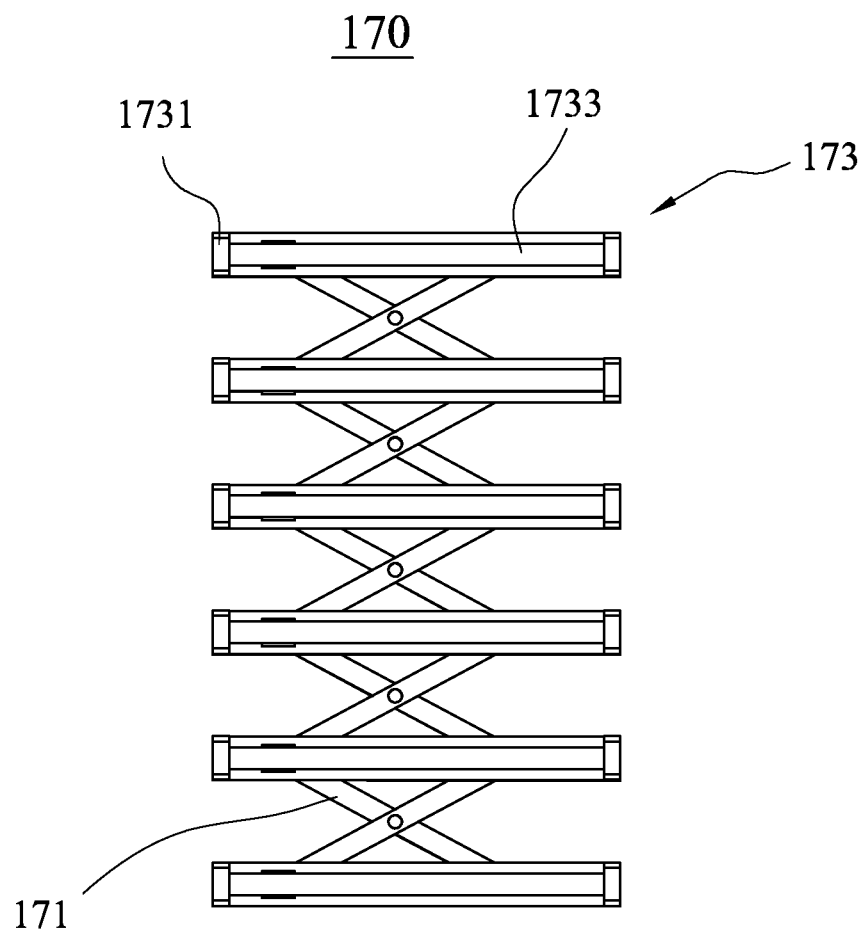
FIG. 4 is a schematic diagram of a self-adaptive extendable transfer mechanism in FIG. 1.

Referring to FIGS. 1 and 4, the self-adaptive extendable transfer mechanism 170 includes a second cross frame 171 and a plurality of seated rollers 173, and the plurality of seated rollers 173 are sequentially arranged on the second cross frame 171 along an extending direction of the second cross frame 171. Similarly, a fixed side of the second cross frame 171 is hinged to a seated roller 173, and a movable side of the second cross frame 171 is slidably connected to the seated roller 173. During the extension and contraction of the second cross frame 171, adjacent seated rollers 173 are driven to move towards or away from each other. A seated roller 173 at one end of the second cross frame 171 is rotatably connected to the output end of the conveyor mechanism 130, and a seated roller 173 at the other end of the second cross frame 171 is rotatably connected to the sliding frame 197.

Each of the seated rollers 173 includes a mounting seat 1731 and a roller 1733 which is rotatably arranged on the mounting seat 1731. The mounting seat 1731 is connected with the second cross frame 171 which is movable, that is, the fixed side of the second scissor frame 171 is hinged with the mounting base 1731, and the movable side of the second scissor frame 171 is slidably connected with the mounting base 1731.

In practical applications of the self-adaptive luggage transfer device, the lifting mechanism 150 drives the conveyor mechanism 130 to lift according to the height of the baggage stacked on the airport luggage car, so as to facilitate the manual transferring of the luggage to the conveyor mechanism 130. The conveyor mechanism 130 drives one end of the self-adaptive extendable transfer mechanism 170 connected to the conveyor mechanism 130 to move in the vertical direction. Meanwhile, at least one end of the self-adaptive extendable transfer mechanism 170 is driven by the lifting mechanism 150 to move in the horizontal direction. The self-adaptive extendable transfer mechanism 170 moves in the horizontal and vertical directions to allow the self-adaptive extendable transfer mechanism 170 to extend in an extension direction thereof. In this way, the inclination angle of the self-adaptive extendable transfer mechanism 170 relative to the conveyor mechanism 130 is ensured to be constant during the lifting of the conveyor mechanism 130, which allows the luggage output by the conveyor mechanism 130 to be stably transferred on the ground conveyor belt.

The self-adaptive baggage transfer device 100 in this embodiment is suitable for transferring baggage in airports, which reduces the labor intensity and increases the transfer speed while ensuring the safety of the baggage.

Embodiment 2

Figure 5:
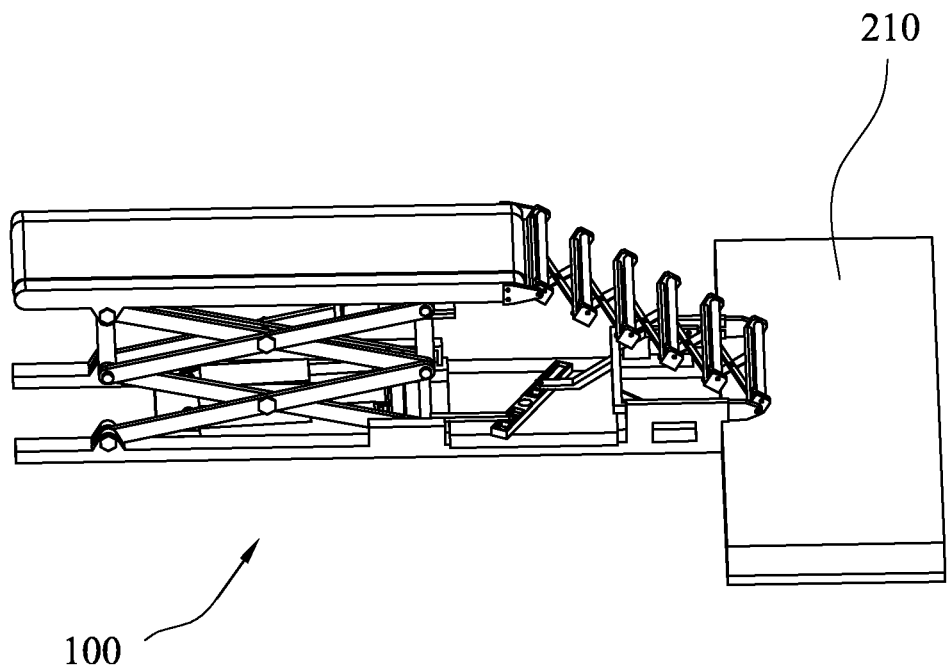
FIG. 5 is a schematic diagram of a self-adaptive luggage transfer system according to an embodiment of the present disclosure.

Referring to FIGS. 1 and 5, this embodiment provides a self-adaptive luggage transfer system 200, including a ground conveyor 210 and the self-adaptive luggage transfer device 100 provided in Embodiment 1. The ground conveyor 210 is arranged under one end of the self-adaptive extendable transfer mechanism 170 connected to the base 110. The ground conveyor 210 may be various conveyors such as a conveyor belt.

The self-adaptive baggage transfer system 200 of this embodiment is able to assist the baggage transfer, which reduces the labor intensity and increases the transfer speed while ensuring the safety of the baggage.

The above are only preferred embodiments of the present disclosure and are not intended to limit the scope of the present disclosure. Various modifications and changes can be made by those skilled in the art without departing from the spirit of the present disclosure, and such modifications and changes shall fall within the scope of the present disclosure.

What is claimed is:

1. A self-adaptive luggage transfer device, comprising a base, a conveyor mechanism, a lifting mechanism, a self-adaptive extendable transfer mechanism and a linkage mechanism;
wherein the lifting mechanism is arranged between the conveyor mechanism and the base, and is configured to drive the conveyor mechanism to lift relative to the base;
the self-adaptive extendable transfer mechanism is obliquely arranged between the conveyor mechanism and the base, and two ends of the self-adaptive extendable transfer mechanism are movably connected to an output end of the conveyor mechanism and the base, respectively; the conveyor mechanism is configured to drive an end of the self-adaptive extendable transfer mechanism connected to the conveyor mechanism to lift in a first direction, and the lifting mechanism is configured to drive at least one end of the self-adaptive extendable transfer mechanism to move in a second direction, so as to ensure that an inclination angle of the self-adaptive extendable transfer mechanism relative to the conveyor mechanism is constant within a preset range; and
the linkage mechanism comprises a first connecting rod, a movable part, and a second connecting rod; one end of the first connecting rod and one end of the second connecting rod are movably connected to the movable part, respectively; the other end of the first connecting rod is connected to the lifting mechanism, and the other end of the second connecting rod is connected to an end of the self-adaptive extendable transfer mechanism connected to the base; and the lifting mechanism drives the first connecting rod and the second connecting rod to move toward or away from each other in the second direction.

2. The self-adaptive luggage transfer device of claim 1, wherein the lifting mechanism comprises a first cross frame and a drive member which is arranged on the base; two ends of the first cross frame are respectively connected to the conveyor mechanism and the base; a movable side of the end of the first cross frame connected to the base is connected to the drive member and the end of the first connecting rod away from the movable part, respectively, and the drive member drives the movable side of the end of the first cross frame to slide relative to the base in the second direction.

3. The self-adaptive luggage transfer device of claim 1, wherein the movable part is provided with a first groove and a second groove; a first slider is rotatably provided at one end of the first connecting rod and is slidably arranged in the first groove; and a second slider is provided at one end of the second connecting rod and is slidably arranged in the second groove.

4. The self-adaptive luggage transfer device of claim 3, wherein the first groove and the second groove extend in a same straight line; and a position between the first groove and the second groove on the movable part is rotatably connected to the base.

5. The self-adaptive luggage transfer device of claim 1, wherein the linkage mechanism further comprises a sliding frame; the base is provided with a slide rail extending in the second direction; one end of the sliding frame is connected to the end of the second connecting rod away from the movable part, and the other end of the sliding frame passes through the slide rail and is rotatably connected to the end of the self-adaptive extendable transfer mechanism away from the conveyor mechanism.

6. The self-adaptive luggage transfer device of claim 5, wherein the sliding frame comprises a transverse frame, a first sliding structure, and a second sliding structure; the transverse frame is connected to the end of the second connecting rod away from the movable part; one end of the first sliding structure and one end of the second sliding structure are respectively connected to two ends of the transverse frame; and
there are two slide rails; the other end of the first sliding structure and the other end of the second sliding structure respectively pass through the two slide rails and are rotatably connected to the self-adaptive extendable transfer mechanism.

7. The self-adaptive luggage transfer device of claim 5, wherein the self-adaptive extendable transfer mechanism comprises a second cross frame and a plurality of seated rollers which are sequentially arranged on the second cross frame along an extending direction of the second cross frame; a seated roller at one end of the second cross frame is rotatably connected to the output end of the conveyor mechanism, and a seated roller at the other end of the second cross frame is rotatably connected to the sliding frame.

8. The self-adaptive luggage transfer device of claim 7, wherein each of the seated rollers comprises a mounting seat and a roller which is rotatably arranged on the mounting seat; and the mounting seat is connected to the second cross frame which is movable.

9. A self-adaptive luggage transfer system, comprising:
the self-adaptive luggage transfer device of claim 1; and
a ground conveyor arranged under the end of the self-adaptive extendable transfer mechanism connected to the base.

10. The self-adaptive luggage transfer system of claim 9, wherein the lifting mechanism comprises a first cross frame and a drive member which is arranged on the base; two ends of the first cross frame are respectively connected to the conveyor mechanism and the base; a movable side of the end of the first cross frame connected to the base is connected to the drive member and the end of the first connecting rod away from the movable part, respectively, and the drive member drives the movable side of the end of the first cross frame to slide relative to the base in the second direction.

11. The self-adaptive luggage transfer system of claim 9, wherein the movable part is provided with a first groove and a second groove; a first slider is rotatably provided at one end of the first connecting rod and is slidably arranged in the first groove; and a second slider is provided at one end of the second connecting rod and is slidably arranged in the second groove.

12. The self-adaptive luggage transfer system of claim 11, wherein the first groove and the second groove extend in a same straight line; and a position between the first groove and the second groove on the movable part is rotatably connected to the base.

13. The self-adaptive luggage transfer system of claim 9, wherein the linkage mechanism further comprises a sliding frame; the base is provided with a slide rail extending in the second direction; one end of the sliding frame is connected to the end of the second connecting rod away from the movable part, and the other end of the sliding frame passes through the slide rail and is rotatably connected to the end of the self-adaptive extendable transfer mechanism away from the conveyor mechanism.

14. The self-adaptive luggage transfer system of claim 13, wherein the sliding frame comprises a transverse frame, a first sliding structure, and a second sliding structure; the transverse frame is connected to the end of the second connecting rod away from the movable part; one end of the first sliding structure and one end of the second sliding structure are respectively connected to two ends of the transverse frame; and
    there are two slide rails; the other end of the first sliding structure and the other end of the second sliding structure respectively pass through the two slide rails and are rotatably connected to the self-adaptive extendable transfer mechanism.

15. The self-adaptive luggage transfer system of claim 13, wherein the self-adaptive extendable transfer mechanism comprises a second cross frame and a plurality of seated rollers which are sequentially arranged on the second cross frame along an extending direction of the second cross frame; a seated roller at one end of the second cross frame is rotatably connected to the output end of the conveyor mechanism, and a seated roller at the other end of the second cross frame is rotatably connected to the sliding frame.

16. The self-adaptive luggage transfer system of claim 15, wherein each of the seated rollers comprises a mounting seat and a roller which is rotatably arranged on the mounting seat; and the mounting seat is connected to the second cross frame which is movable.

\* \* \* \* \*